US011686829B2

(12) United States Patent
Niimura

(10) Patent No.: US 11,686,829 B2
(45) Date of Patent: Jun. 27, 2023

(54) DISPLAY APPARATUS, DISTANCE MEASURING APPARATUS, AND DISPLAY METHOD

(71) Applicant: NIKON VISION CO., LTD., Tokyo (JP)

(72) Inventor: Yoshiyuki Niimura, Sagamihara (JP)

(73) Assignee: NIKON VISION CO., LTD., Toyota (JP)

( * ) Notice: Subject to any disclaimer, the term of this patent is extended or adjusted under 35 U.S.C. 154(b) by 529 days.

(21) Appl. No.: 16/895,218

(22) Filed: Jun. 8, 2020

(65) Prior Publication Data

US 2020/0386877 A1 Dec. 10, 2020

(30) Foreign Application Priority Data

Jun. 7, 2019 (JP) .................................. 2019-107287

(51) Int. Cl.
| | |
|---|---|
| *G01C 3/08* | (2006.01) |
| *G01S 7/51* | (2006.01) |
| *G01S 17/87* | (2020.01) |
| *G01S 17/42* | (2006.01) |

(52) U.S. Cl.
CPC .................. *G01S 7/51* (2013.01); *G01C 3/08* (2013.01); *G01S 17/42* (2013.01); *G01S 17/87* (2013.01)

(58) Field of Classification Search
CPC . G01S 7/51; G01S 17/42; G01S 17/87; G01C 3/08
See application file for complete search history.

(56) References Cited

U.S. PATENT DOCUMENTS

2017/0299335 A1 10/2017 Stantchev

FOREIGN PATENT DOCUMENTS

| JP | 2002-039748 A | 2/2002 |
| JP | 2006-189407 A | 7/2006 |
| JP | 2008-281379 A | 11/2008 |
| JP | 2015-505442 A | 2/2015 |

OTHER PUBLICATIONS

Jan. 31, 2023 Notice of Reasons for Refusal issued in Japanese Patent Application No. 2019-107287.

*Primary Examiner* — Mathew Franklin Gordon
(74) *Attorney, Agent, or Firm* — Oliff PLC

(57) ABSTRACT

A display apparatus according to the present embodiment includes a storage section for storing distance measurement data acquired by performing a distance measurement and position data indicating a position at which the distance measurement was performed as a set, a position detecting section for detecting a current position, and a display section for displaying the distance measurement data stored as a set with the position data corresponding to the detection result of the current position detected by the position detecting section, within the distance measurement data stored in the storage section. By displaying, with the display section, the distance measurement data stored as a set with the position data corresponding to the detection result of the current position detected by the position detecting section, within the distance measurement data stored in the storage section, only necessary distance measurement data corresponding to the current position can be displayed to the user.

20 Claims, 11 Drawing Sheets

| MEASUREMENT DISTANCE | MEASUREMENT POSITION | MEASUREMENT TIMING |
|---|---|---|
| 243 m | a3 | 2019/4/14 11:00 |
| 198 m | b2 | 2019/4/15 13:30 |
| 150 m | a2 | 2019/4/14 10:30 |
| 90 m | b1 | 2019/4/15 14:00 |
| 48 m | a1 | 2019/4/14 10:30 |

*FIG. 4*

| MEASUREMENT DISTANCE | MEASUREMENT POSITION | MEASUREMENT TIMING |
|---|---|---|
| 243 m | a3 | 2019/4/14 11:00 |
| 150 m | a2 | 2019/4/14 10:30 |
| 48 m | a1 | 2019/4/14 10:30 |

*FIG. 5*

| MEASUREMENT DISTANCE | MEASUREMENT POSITION | MEASUREMENT TIMING |
|---|---|---|
| 90 m | b1 | 2019/4/15 14:00 |
| 198 m | b2 | 2019/4/15 13:30 |

FIG. 6

| MEASUREMENT POSITION | ORIENTATION | HEIGHT |
|:---:|:---:|:---:|
| c | d | 10 m |
| c | e | 25 m |
| c | f | 50 m |

*FIG. 10*

| MEASUREMENT POSITION | ORIENTATION | HEIGHT |
|---|---|---|
| c | d | 10 m |

FIG. 11

DISPLAY APPARATUS, DISTANCE MEASURING APPARATUS, AND DISPLAY METHOD

The contents of the following Japanese patent application are incorporated herein by reference:
NO. 2019-107287 filed in JP on Jun. 7, 2019.

BACKGROUND

1. Technical Field

The present invention relates to a display apparatus, a distance measuring apparatus, and a display method.

2. Related Art

Technology is known for measuring a distance to a target object using a distance measuring apparatus such as a laser range finder (LRF) or the like. In competitions such as shooting games, if it is known that there is a limited time for measuring the target object with the distance measuring apparatus, there are cases where a user measures the distance to a target object at each position in advance, records this information on paper or the like, and references this information during the competition. Recording this information on paper requires time and effort, and it is difficult to check this information during the competition.
Patent Document 1: Japanese Patent Application Publication No. 2008-281379

GENERAL DISCLOSURE

According to a first aspect of the present invention, provided is a display apparatus for displaying distance measurement data, comprising a storage section for storing distance measurement data acquired by measuring a distance and position data indicating a position at which the distance measurement was performed, as a set; a position detecting section for detecting a current position; and a display section for displaying distance measurement data stored as a set with the position data corresponding to a detection result of the current position detected by the position detecting section, within the distance measurement data stored in the storage section.

According to a second aspect of the present invention, provided is a distance measuring apparatus comprising a main body for measuring a distance; and the display apparatus according to the first aspect that is attached in a detachable manner to the main body and that is for displaying distance measurement data acquired by measuring a distance with the main body.

According to a third aspect of the present invention, provided is a distance measuring apparatus comprising a main body for measuring a distance; a storage section for storing distance measurement data acquired by measuring a distance and position data indicating a position at which the distance measurement was performed, as a set; a position detecting section for detecting a current position; and a display section for displaying distance measurement data stored as a set with the position data corresponding to a detection result of the current position detected by the position detecting section, within the distance measurement data stored in the storage section, based on the current position detected by the position detecting section.

According to a fourth aspect of the present invention, provided is a display method for displaying distance measurement data with a display apparatus, comprising storing distance measurement data acquired by measuring a distance and position data indicating a position at which the distance measurement was performed, as a set; detecting a current position; and displaying distance measurement data stored as a set with the position data corresponding to a detection result of the current position, within the stored distance measurement data.

The summary clause does not necessarily describe all necessary features of the embodiments of the present invention. The present invention may also be a sub-combination of the features described above.

BRIEF DESCRIPTION OF THE DRAWINGS

FIG. 4 shows an example of stored sets of the distance measurement data (measurement distance), position data (measurement position), and measurement timing.

FIG. 5 shows an example of displayed sets of the distance measurement data (measurement distance), the position data (measurement position), and the measurement timing.

FIG. 6 shows another example of displayed sets of the distance measurement data (measurement distance), the position data (measurement position), and the measurement timing.

FIG. 10 shows an example of stored sets of height data (height), position data (measurement position), and orientation data (orientation).

FIG. 11 shows an example of displayed sets of height data (height), position data (measurement position), and orientation data (orientation).

DESCRIPTION OF EXEMPLARY EMBODIMENTS

Hereinafter, some embodiments of the present invention will be described, but the embodiments do not limit the invention according to the claims. Furthermore, all the combinations of the features described in the embodiments are not necessarily essential to means provided by aspects of the invention.

Figure 1:
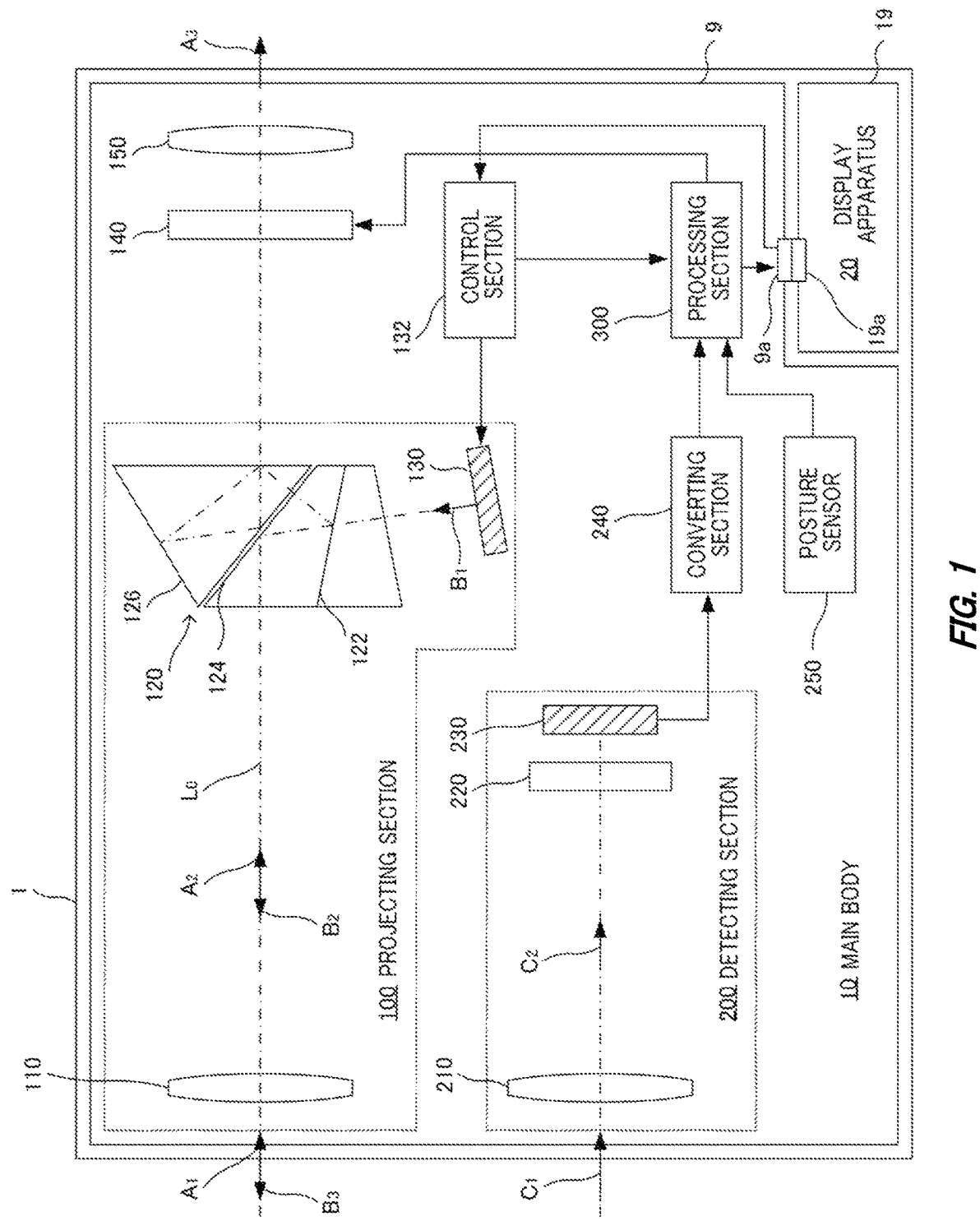
FIG. 1 shows a configuration of a distance measuring apparatus and a main body according to the present embodiment.

FIG. 1 shows a configuration of a distance measuring apparatus 1 and a main body 10 according to the present embodiment. The distance measuring apparatus 1 is an apparatus for measuring a distance. Here, the distance is not limited to being a distance in a horizontal direction, and may be a distance in a vertical direction (i.e. a height). The distance measuring apparatus 1 includes the main body 10 and a display apparatus 20.

The main body 10 is a body portion of the distance measuring apparatus 1 that includes components for measuring distance using light detection. Here, a direction in which a projecting section 100 emits measurement light, which is the arrow direction of the light ray $B_3$, is a forward direction, and the opposite direction, which is the arrow direction of the light ray $A_3$, is a backward direction. The main body 10 includes a case 9, a projecting section 100, a reticle plate 140, an eyepiece lens 150, a control section 132, a detecting section 200, a converting section 240, a posture sensor 250, and a processing section 300.

The case 9 is a case that holds each configurational section of the main body 10 therein, and houses the display apparatus 20 in a detachable manner. As an example, the case 9 has a recessed portion (not shown in the drawings) provided in a portion of an outer surface thereof, and the display apparatus 20 is housed in this recessed portion with a display screen of a display device 25 and a manipulation portion of a manipulation device 29 being exposed in the outer surface of the case 9. At this time, the display apparatus 20 is connected to a connector 9a provided within the recessed portion. By attaching the display apparatus 20 to the case 9 in this way, it is possible to transmit and receive signals between the display apparatus 20 and the main body 10, transmit processing results (i.e. distance measurement data) obtained by the processing section 300 of the main body 10, for example, to the display apparatus 20 and store these processing results in a storage device 21, transmit manipulation signals obtained by the manipulation device 29 of the display apparatus 20 to the processing section 300 of the main body 10 and operate the main body 10, and electrically connect an electronic component inside the main body 10 to a battery 28 inside the display apparatus 20.

The projecting section 100 is a unit that projects measurement light a plurality of times onto the target object. The projecting section 100 includes a light emitting section 130, an erect prism 120, and an objective lens 110.

The light emitting section 130 uses a light source to emit measurement light (i.e. the light ray $B_1$), which is pulsed with a constant period, toward the erect prism 120. A semiconductor laser that oscillates infrared rays, for example, can be adopted as the light source. In a single distance measurement operation, the light emitting section 130 emits a predetermined number, e.g. 320, of pulsed measurement lights with a constant period, e.g. a period from 500 to 700 microseconds.

The erect prism 120 is an optical element that sends the measurement light emitted from the light emitting section 130 forward and sends an incident light ray to the eyepiece lens 150 located to the rear. A roof prism, Porro prism, or the like, for example, can be adopted as the erect prism 120. The erect prism 120 includes a dichroic reflection surface 122 that reflects light in a visible light band and transparently passes light in an infrared band, and total reflection surfaces 124 and 126 that have a high reflectance with respect to both the visible light band and the infrared band. The measurement light (light ray $B_1$) transparently passes through the dichroic reflection surface 122 in the erect prism 120, and is then reflected by the total reflection surface 124 to propagate forward within the main body 10 as the light ray $B_2$. The incident light ray (light ray $A_1$) is reflected by the dichroic reflection surface 122, the total reflection surfaces 124 and 126, and another reflection surface within the erect prism 120. In this way, an inverted mirror image formed by the incident light ray is inverted to be an erect image.

The objective lens 110 is an optical element that collimates the light ray $B_2$ output from the erect prism 120 and sends the resulting light ray to in front of the main body 10 as a light ray $B_3$.

The reticle plate 140 is arranged at a focal point position of the objective lens 110. The reticle plate 140 includes a collimation index and a display section (neither of which are shown in the drawings). The collimation index is shaped as a cross, a rectangular frame, a circular frame, or the like, for example. The collimation index may be formed by being printed, etched, or the like on a board that is transparent to visible light, or may be displayed using transparent liquid crystals. The display section shows the measurement result of the distance to the target object to the user through characters, images, or the like, using transparent liquid crystals or the like. Instead of providing the display section directly to the reticle plate 140, the display section may be formed by reflective liquid crystals and an optical system that guides a display image using these liquid crystals to the reticle plate 140. The display section may display a remaining battery amount, an alert, a clock, or the like along with the measurement results.

The eyepiece lens 150 is an optical element that focuses the incident light ray and sends this light ray backward as the light ray $A_3$. Within the main body 10, the front end of the eyepiece lens 150 faces the rear end of the erect prism 120.

The erect prism 120, the objective lens 110, the reticle plate 140, and the eyepiece lens 150 form a collimating section for a user to collimate the distance measuring apparatus 1 with respect to a target object. The collimating section includes the projecting section 100 and a portion of the optical system, and therefore, in the distance measuring apparatus 1 (i.e. the main body 10), apparent optical axes of the projecting section 100 and the collimating section are the same.

Within the light reflected or scattered from the target object positioned in front of the distance measuring apparatus 1 (i.e. the main body 10), the light ray $A_1$ that is propagated within a range of the angle of view of the objective lens 110 is incident to the collimating section. The light ray $A_1$ is focused as the light ray $A_2$ via the objective lens 110, and is emitted, as the light ray $A_3$, to the rear of the distance measuring apparatus 1 (i.e. the main body 10) through the erect prism 120, the reticle plate 140, and the eyepiece lens 150. In this way, the user can observe the erect image of the target object through the eyepiece lens 150.

The collimation index arranged on the reticle plate 140 is superimposed on the image of the target object observed by the user through the eyepiece lens 150. In this way, by superimposing the collimation index on the image observed through the eyepiece lens 150, the user collimates the distance measuring apparatus 1 (i.e. the main body 10) to the target object. In this case, as described above, the apparent optical axes of the projecting section 100 and the collimating section are the same, and therefore the measurement light is radiated onto a position indicated by the collimation index.

The control section 132 is a unit that controls the intensity, number of emissions, period, and the like of the measurement light emitted from the projecting section 100 (light emitting section 130). Furthermore, the control section 132 transmits an emission timing of the measurement light to the processing section 300. In this way, the processing section 300 can process the reflected light detection signal output from the detecting section 200, in response to the projection of each measurement light by the projecting section 100. Note that, the control section 132 starts the distance measurement operation described further below by receiving a manipulation signal generated by the user pressing the manipulation device 29 provided in the display apparatus 20.

The detecting section 200 is a unit that detects the reflected light from the target object and outputs a detection signal with an electric signal format. The detecting section 200 includes a light receiving lens 210, a bandpass filter 220, and a light receiving element 230.

The light receiving lens 210 is an optical element that focuses the reflected light from the target object (i.e. a light ray $C_1$) and sends this light to the light receiving element 230 as a light ray $C_2$. Note that, the light receiving lens 210 has a different optical axis than the objective lens 110 of the projecting section 100.

The bandpass filter 220 is an optical element that transparently passes light in a narrow band including the reflected light, and blocks or attenuates light in other bands. The bandpass filter 220 is arranged behind the light receiving lens 210.

The light receiving element 230 is an element that receives the reflected light and outputs an electrical signal (also referred to as a light reception signal) corresponding to the intensity of the reflected light. A photodiode, phototransistor, or the like that is sensitive to the band of the measurement light, for example, can be adopted as the light receiving element 230. The light receiving element 230 is arranged behind the bandpass filter 220. Note that, from the viewpoint of eliminating the effect of background light on the measurement light, the light receiving surface area of the light receiving element 230 is preferably smaller.

In the detecting section 200 having the configuration described above, the light ray $C_1$ reflected or scattered from the target object positioned in front of the main body 10 is incident to the light receiving lens 210. The light ray $C_1$ is focused by the light receiving lens 210, passes through the bandpass filter 220 as the light ray $C_2$, and is then received by the light receiving element 230. The light receiving element 230 outputs the light reception signal corresponding to the intensity of the received light toward the converting section 240.

The converting section 240 includes an amplifier, for example, to thereby amplify the light reception signal output from the light receiving element 230. The converting section 240 may further convert the light reception signal into a differential signal. In this way, it is possible to reduce the transmission noise. The converting section 240 supplies the amplified light reception signal to the processing section 300 as the detection signal.

The posture sensor 250 is a sensor or sensor group that detects the posture of a device body (i.e. the distance measuring apparatus 1). The posture sensor 250 is included on a case 9 or a circuit substrate fixed inside the case 9, and therefore the detection result of the posture sensor 250 is influenced by the posture of the main body 10 (i.e. the distance measuring apparatus 1). Here, the posture refers to the orientation and inclination of the case 9, and is expressed by an orientation (i.e. an orientation in a horizontal plane) φ and an angle (i.e. an angle relative to the horizontal plane or a vertical axis) θ in a reference coordinate system. Note that, as an example, the angle can be detected from a detection result of an angular velocity or acceleration made by an inclination sensor such as an angular velocity sensor or acceleration sensor, and the orientation can be detected by an orientation sensor such as a geomagnetic sensor, for example. The measurable angle range is ±89 degrees, for example, and the orientation range is ±180 degrees, for example. These detection results are transmitted to the processing section 300.

The processing section 300 is a unit that determines the distance to the target object, the inclination to the target object, and the height of the target object based on the detection signal output from the converting section 240 and the detection results output from the posture sensor 250. The straight-line distance D to the target object can be determined by using a time of flight (TOF) technique, that is, by determining a time (reflected light detection time) T during which the detecting section 200 (light receiving element 230) detected the reflected light of the measurement light, which is a reflection, by the target object, of each measurement light projected by the projecting section 100, and calculating this straight-line distance D from the determined detection time T of the reflected light according to the formula Tc/2 (where c is the speed of light). Note that, the time needed for light to travel a distance equivalent to the round trip from the measurement position where the measurement light is emitted to the target object is the detection time T, and therefore half of the detection time T is multiplied by the speed of light c in the above formula. The inclination to the target object can be determined by the detection result of the angle θ output from the posture sensor 250. The distance (i.e. horizontal distance) d to the target object and the height h of the target object can be determined respectively by the formulas $D \cos(\theta)$ and $D \sin(\theta)$ based on the direct-line distance D and the inclination θ.

The processing section 300 displays, in the reticle plate 140, the determined distance, inclination, and height (these pieces of data acquired by measuring the distance using the distance measuring apparatus 1 are referred to collectively as distance measurement data). In this way, distance measurement data is superimposed on the image of the measurement target object observed by the user through the eyepiece lens 150. Furthermore, the processing section 300 transmits the distance measurement data to the display apparatus 20.

The display apparatus 20 is an apparatus that displays the distance measurement data acquired by measuring the distance with the main body 10. The display apparatus 20 is attached in a detachable manner to the case 9 of the main body 10, as described above. In this way, it is possible to remove the display apparatus 20 from the main body 10 and carry away only the distance measurement data. Note that, the display apparatus 20 may be a wearable apparatus such as an apparatus worn on an arm of the user.

Figure 2:
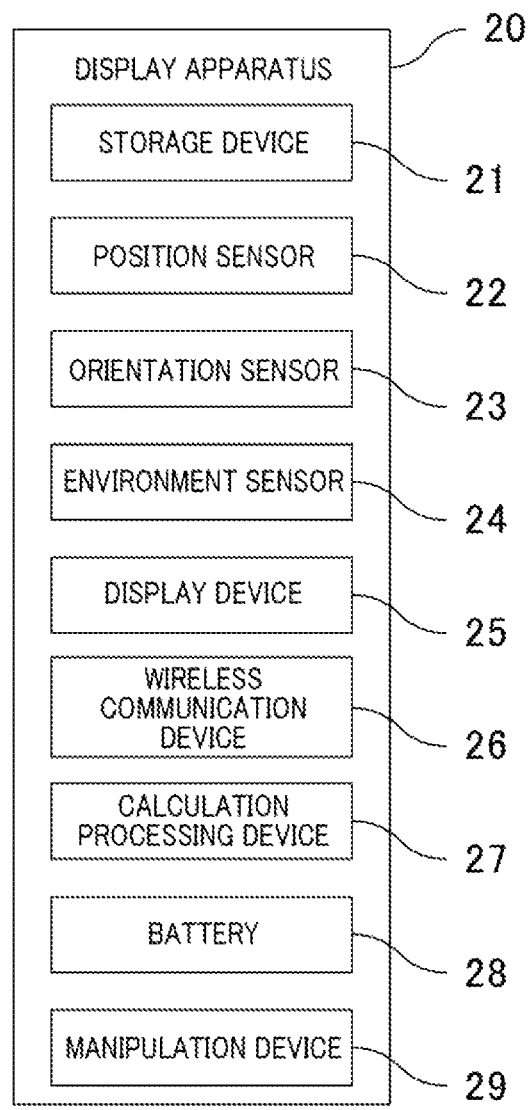
FIG. 2 shows a configuration (hardware configuration) of a display apparatus.

FIG. 2 shows a configuration (hardware configuration) of the display apparatus 20. The display apparatus 20 includes the case 19, the storage device 21, a position sensor 22, an orientation sensor 23, an environment sensor 24, the display device 25, a wireless communication device 26, a calculation processing device 27, the battery 28, and the manipulation device 29.

The case 19 is a case that holds each configurational section of the display apparatus 20 therein. The case 19 includes the connector 19a on a portion of the outer surface thereof, for example, and the connector 19a is connected to a connector 9a of the main body 10 when the display apparatus 20 is housed within the recessed portion of the main body 10. In this way, it is possible to transmit and receive signals between the display apparatus 20 and the main body 10. Furthermore, it is possible to supply power from the battery 28 in the display apparatus 20 to electronic components within the main body 10.

The storage device 21 is a device that stores distance measurement data or the like that is obtained by distance measurement performed by the distance measuring apparatus 1 and transmitted from the main body 10 (processing section 300). A nonvolatile memory, for example, can be adopted as the storage device 21. By providing the storage device 21 inside the display apparatus 20 instead of inside the main body 10, it is possible to make the main body 10 unusable in a state where the display apparatus 20 is removed, and therefore even if the unused main body 10 from which the display apparatus 20 has been removed were to be stolen, leaking of the distance measurement data could be prevented.

The position sensor 22 is a sensor that detects the current position of the display apparatus 20. A global positioning system (GPS) device can be adopted as the position sensor 22. By including the position sensor 22 in the display apparatus 20 instead of in the main body 10, the positioning function of the distance measuring apparatus 1 (i.e. the main body 10 itself) cannot be used with the main body 10 removed from the display apparatus 20, and therefore, in a case where the distance measuring apparatus 1 includes a battery, for example, it is possible to restrict unnecessary battery consumption caused by constantly detecting the current position.

The orientation sensor 23 is a sensor that detects a direction (i.e. an orientation) that the display apparatus 20 faces within a horizontal plane. A geomagnetic sensor that detects geomagnetism and determines the orientation based on this geomagnetism can be adopted as the orientation sensor 23. Note that, the measurable orientation range is ±180 degrees, for example. By orienting the display apparatus in the direction of the target object to which the distance is to be measured, it is possible to measure the orientation of the target object to which the distance is to be measured with the current position as a reference.

The environment sensor 24 is a sensor or sensor group that detects an environmental state (temperature, humidity, pressure, or the like) where the display apparatus 20 is placed. A temperature sensor, humidity sensor, pressure sensor, or the like, for example, can be adopted as the environment sensor 24. By detecting the environmental state, it is possible to perform a trajectory correction based on the environmental state, in a calculation of a trajectory of a golf ball, a trajectory of a rifle bullet, or the like based on the distance measurement data. Note that the environment sensor 24 may include a wind speedometer that measures wind velocity and wind direction.

The display device 25 is a device that displays distance measurement data obtained by measuring the distance with the main body 10, a measurement timing at which the distance is measured, and the like. A liquid crystal display, for example, can be adopted as the display device 25. Furthermore, electronic paper that can maintain a display without power can be adopted.

The wireless communication device 26 is a device for performing wireless communication with communication devices other than the display apparatus 20. A BLE (Bluetooth (registered trademark) Low Energy) device can be adopted as the wireless communication device 26. The communication device may include an environmental sensor provided outside the display apparatus 20, such as a wind speedometer, for example, and can thereby acquire the environmental state of the display apparatus 20 from outside the display apparatus 20. Furthermore, the communication device may include another display apparatus, and can thereby share the distance measurement data within a group of display apparatuses associated with the display apparatus 20. The communication device may include the distance measuring apparatus 1, and the display apparatus 20 may receive the distance measurement data, which is acquired by measuring the distance with the distance measuring apparatus 1, through wireless communication.

The calculation processing device (CPU) 27 is a device that executes a program to cause each configurational section of the display apparatus 20 to operate. The functional configuration of the display apparatus 20 is described further below. Note that, a specialized program is stored in a ROM (not shown in the drawing), for example, and is activated by being read by the CPU and expanded in a RAM.

The battery 28 is a power source for operating electronic components included in the main body 10 and the display apparatus 20. By including the battery 28 in the display apparatus 20 instead of in the main body 10, it is impossible to use the distance measuring apparatus 1 in a state where the display apparatus 20 is removed from the main body 10, and therefore, in a case where the distance measuring apparatus 1 includes a battery, for example, it is possible to prevent unnecessary battery consumption due to someone forgetting to turn off the power source or the like.

The manipulation device 29 is a device for manipulating the distance measuring apparatus 1 (main body 10). A manipulation button provided on the outer surface of the case 19 of the display apparatus 20 in a manner to be pressable by the user or a touch sensor provided overlapping the display screen of the display device 25, for example, can be adopted as the manipulation device 29. The manipulation device 29 may further include a selection button for selecting distance measurement data to be displayed in the display screen of the display device 25. By including the manipulation device 29 for manipulating the distance measuring apparatus 1 in the display apparatus 20 instead of in the main body 10, there is no need to have the manipulation device 29 in the main body 10, and therefore it is possible to reduce the size of the distance measuring apparatus.

Figure 3:
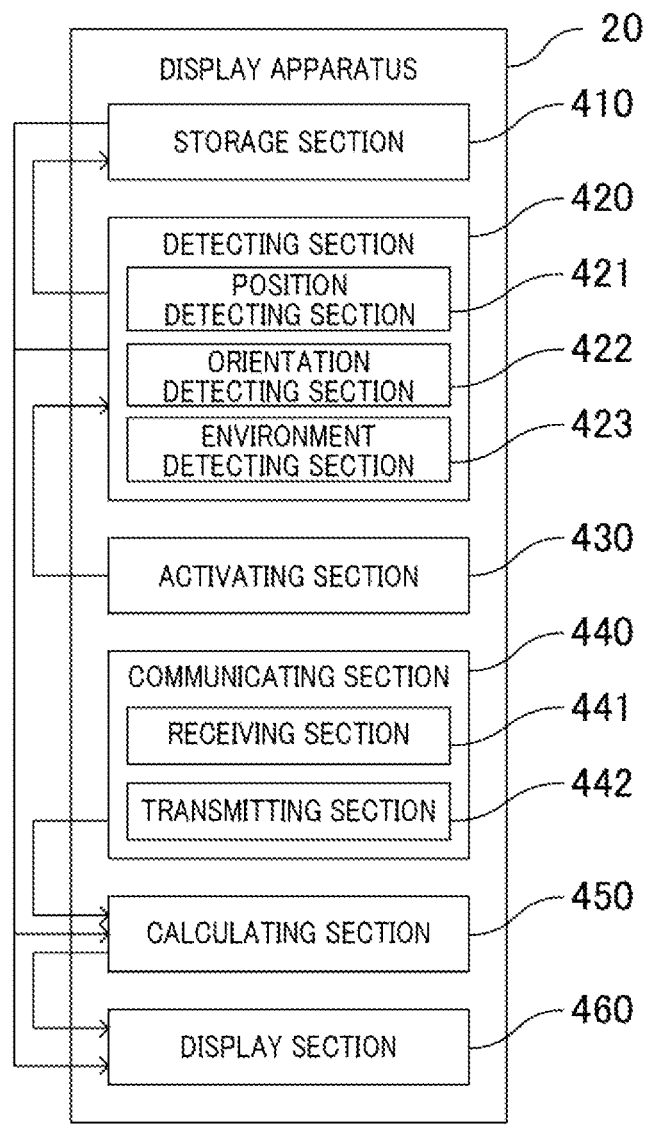
FIG. 3 shows a functional configuration of the display apparatus according to the present embodiment.

FIG. 3 shows a functional configuration of the display apparatus 20. The display apparatus 20 includes a storage section 410, a detecting section 420, an activating section 430, a communicating section 440, a calculating section 450, and a display section 460.

The storage section 410 stores the distance measurement data acquired by measuring the distance with the distance measuring apparatus 1 (main body 10), in the storage device 21. Upon receiving the distance measurement data from the main body 10 (processing section 300), the storage section 410 receives position data indicating the position at which the measurement of the distance was performed from the detecting section 420 (position detecting section 421), and stores the distance measurement data and the position data as a set. Furthermore, the storage section 410 may receive the measurement timing at which the distance was measured from the detecting section 420 (position detecting section 421), and store the distance measurement data, the position data, and the measurement timing as a set. Yet further, the storage section 410 may detect the orientation of the position at which the distance measuring apparatus is to acquire the distance, from the detecting section 420 (orientation detecting section 422), and store the position data, the orientation data, and the distance measurement data as a set.

FIG. 4 shows an example of stored sets of the distance measurement data (measurement distance), position data (measurement position), and measurement timing. As an example, in a shooting game, a plurality of players form a group and shoot at a plurality of targets provided in each stage. Therefore, it is important to display the distances to targets in the same stage. A distance of 48 m to a first target measured at a position a1 within a stage "a" at 10:30 on Apr. 14, 2019, a distance of 150 m to a second target measured at a position a2 within the stage "a" at 10:30 on Apr. 14, 2019, a distance of 243 m to a third target measured at a position a3 within the stage "a" at 11:00 on Apr. 14, 2019, a distance of 90 m to a fourth target measured at a position b1 within a stage "b" at 14:00 on Apr. 15, 2019, and a distance of 198 m to a fifth target measured at a position b2 within the stage "b" at 13:30 on Apr. 15, 2019 are stored. Note that, these pieces of data are sorted and stored in order from the largest measurement distance indicated by the distance measurement data, for example.

The detecting section 420 is a function section that detects the state of the display apparatus 20, and includes the position detecting section 421, an orientation detecting section 422, and an environment detecting section 423. The position detecting section 421 detects the current timing and the current position of the display apparatus 20, using the position sensor 22. Here, by using the position detecting section 421 when the distance measurement operation was performed, it is possible to detect the position (i.e. the measurement position) and the timing (i.e. the measurement timing) of this distance measurement. Note that, the position at which the distance measurement was performed may be a position where the distance measurement was performed in the horizontal direction or a position of a target where the distance was measured, or may be a position where a height measurement was performed or a position in the horizontal direction of a target object whose height was measured. These detection results are transmitted to the storage section 410 and the display section 460. The orientation detecting section 422 detects the orientation of the display apparatus 20 using the orientation sensor 23. Here, the orientation also includes the orientation of the target object for which the distance measurement is to be performed. This detection result is transmitted to the calculating section 450. The environment detecting section 423 detects the environmental state (temperature, humidity, pressure, or the like) where the display apparatus 20 is placed, using the environment sensor 24. These detection results are transmitted to the calculating section 450.

The activating section 430 activates the detecting section 420 and the display section 460. When pressing of the manipulation device 29 provided in the display apparatus 20 by the user is sensed (or a certain time after this), if the display apparatus 20 is attached to the main body 10, the activating section 430 transmits the manipulation signal to the control section 132 of the main body 10 to start the distance measurement operation described further below, and also transmits the manipulation signal to the detecting section 420 to activate the detecting section 420, performs the detection of the current position, orientation, and environmental state of the display apparatus 20, and updates these results, and if the display apparatus 20 is removed from the main body 10, transmits the manipulation signal to only the detecting section 420 to activate the detecting section 420, performs the detection of the current position, orientation, and environmental state of the display apparatus 20, and updates these results. After this, the activating section 430 transmits the manipulation signal to the display section 460 to activate the display section 460, and displays the distance measurement data in the display screen of the display device 25 or updates this display.

The communicating section 440 performs wireless communication with a communication device other than the display apparatus 20, using the wireless communication device 26. The communicating section 440 includes a receiving section 441 and a transmitting section 442. The receiving section 441 receives the wind velocity and wind direction measurement results measured by the wind speedometer (not shown in the drawings) that is separate from the display apparatus 20. Furthermore, the receiving section 441 may receive measurement results concerning the environmental state measured by the other environmental sensors provided outside the display apparatus 20. The receiving section 441 may receive the distance measurement data acquired by measuring the distance with the distance measuring apparatus 1. The transmitting section 442 transmits the distance measurement data to a display apparatus (i.e. an extension unit) that is separate from the display apparatus 20. In this way, it is possible to share the distance measurement data in a group of display apparatuses associated with the display apparatus 20. Here, the distance measurement data to be transmitted may be the distance measurement data that is stored as a set with position data corresponding to the detection result of the current position detected by the position detecting section 421.

The calculating section 450 calculates the trajectory based on the distance measurement data, using the calculation processing device 27. Here, by having the user select the distance measurement data via the manipulation device 29, it is possible to calculate the trajectory of a golf ball, various flying objects including a rifle bullet, a projectile, or the like, for example. The calculating section 450 may further correct the trajectory calculation that is based on the distance measurement data, based on the measurement results of the wind velocity and wind direction received from the wind speedometer via the communicating section 440 (receiving section 441), the detection result of the orientation detected by the detecting section 420 (orientation detecting section 422), and the detection results of the environmental state such as the temperature, humidity, and pressure detected by the detecting section 420 (environment detecting section 423).

The display section 460 displays the distance measurement data in the display screen of the display device 25. The display section 460 reads and displays the distance measurement data that is stored as a set with the position data corresponding to the detection result of the current position detected by the position detecting section 421, within the distance measurement data stored in the storage section 410 (storage device 21). Here, the position data corresponding to the current position refers to position data for which the position indicated by the position data approximately matches the current position and the position indicated by the position data is included within a predetermined distance range from the current position or included in a stage or area associated with the current position. Furthermore, the display section 460 may display the distance measurement data stored as a set with the orientation data corresponding to the detection result of the orientation of the target object, for which distance measurement was performed, detected by the orientation detecting section and the position data corresponding to the detection result of the current position of detected by the position detecting section 421, within the distance measurement data stored in the storage section 410 (storage device 21). Here, the orientation data corresponding to the orientation of the target object for which distance measurement was performed refers to the orientation data for which the orientation indicated by the orientation data approximately matches the orientation of the target object for which the distance measurement was performed and the orientation indicated by the orientation data is included in a predetermined orientation range from the orientation of the target object for which the distance measurement was performed.

FIG. 5 shows an example of sets of the distance measurement data (measurement distance), the position data (measurement position), and the measurement timing displayed in the display screen of the display device 25. Here, it is assumed that the position a5 in the stage "a" is detected by the position detecting section 421 as the current position of the display apparatus 20. The display section 460 displays the three pieces of distance measurement data in which the measurement position indicated by the position data is included in the stage "a" associated with the current position a5, namely the distance of 48 m to the first target measured at the position a1 in the stage "a" at 10:30 on Apr. 14, 2019, the distance of 150 m to the second target measured at the position a2 in the stage "a" at 10:30 on Apr. 14, 2019, and the distance of 243 m to the third target measured at the position a3 in the stage "a" at 11:00 on Apr. 14, 2019, within the distance measurement data stored in the storage section 410 (storage device 21), in the reverse of the measurement timing order. Note that, in a case where the position a5 in the stage "a" has been detected by the position detecting section 421 as the current position of the display apparatus 20, among these three pieces of distance measurement data, only the distance measurement data for which the measurement position approximately matches the current position or is included within a predetermined distance range from the current position may be displayed.

The position detecting section 421 is activated by the activating section 430 to detect and update the current position, and the distance measurement data stored as a set with the position data corresponding to this updated current position is displayed by the display section 460, thereby making it possible to update the display in the display device 25.

FIG. 6 shows another example of sets of the distance measurement data (measurement distance), position data (measurement position), and measurement timing displayed in the display screen of the display device 25. Here, it is assumed that the current position of the display apparatus 20 is detected by the position detecting section 421 and updated to be the position b4 in the stage "b". The display section 460 displays the two pieces of distance measurement data in which the measurement position indicated by the position data is included in the stage "b" associated with the current position b4, namely the distance of 90 m to the fourth target measured at the position b1 in the stage "b" at 14:00 on Apr. 15, 2019 and the distance of 198 m to the fifth target measured at the position b2 in the stage "b" at 13:30 on Apr. 15, 2019, within the distance measurement data stored in the storage section 410 (storage device 21), in the reverse of the measurement timing order and updates the distance measurement data.

The display section 460 may display the distance measurement data along with the measurement timing corresponding thereto in the display screen of the display device 25. Here, the measurement timing may be appended as an index of the distance measurement data, and the distance measurement data may be displayed in the order or the reverse order of the measurement timing. By also displaying the measurement timing at which the distance measurement was performed, it is possible to know when the distance measurement data was obtained, and further, by also displaying the position data, it is possible to know which distance is being indicated by the distance measurement data. Furthermore, the display section 460 may display a plurality of numbers from 1 to any number appended to the distance measurement data as an index in the display screen of the display device 25. In this way, it is possible to select the distance measurement data to be displayed in the display screen by pressing the button corresponding to the index, among the selection buttons included in the manipulation device 29.

Note that, the display section 460 may display the distance measurement data in order from the largest or smallest distance measurement result, or may display the distance measurement data in order of the positions indicated by the position data that are closest to or farthest from the current position. Furthermore, the display section 460 may switch the display of the display units of the distance measurement data between meters and yards, for example, according to a manipulation of the manipulation device 29.

Figure 7:
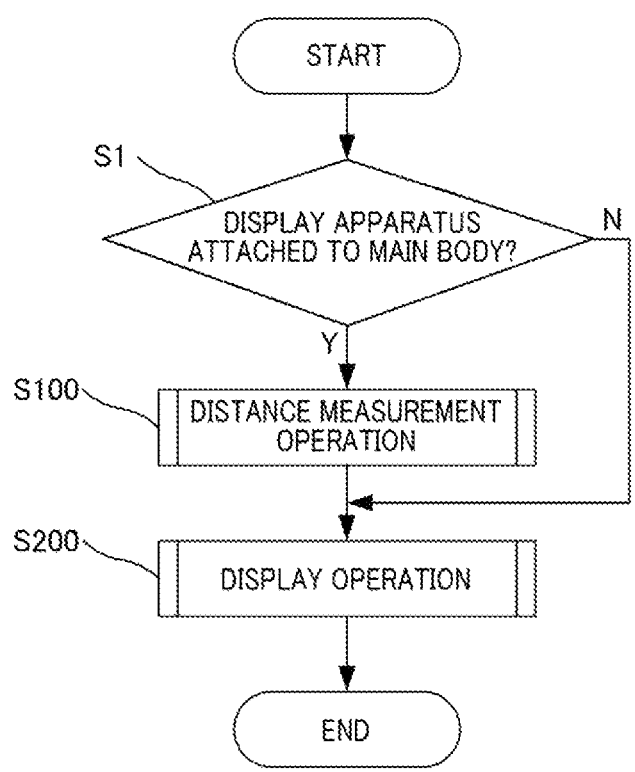
FIG. 7 shows a flow of a distance measurement and display operation performed by the distance measuring apparatus according to the present embodiment.

FIG. 7 shows a flow of a distance measurement and display operation performed by the distance measuring apparatus 1 according to the present embodiment. The operation flow is started by the activating section 430 of the display apparatus 20 sensing that the user has pressed the manipulation device 29 provided in the display apparatus 20.

At step S1, the activating section 430 of the display apparatus 20 judges whether the display apparatus 20 is attached to the main body 10. If the display apparatus 20 is attached to the main body 10, the process moves to step S100 and the distance measurement operation is performed, and if the display apparatus 20 is not attached to the main body 10, the process moves to step S200 and the display operation is performed.

At step S100, the activating section 430 of the display apparatus 20 transmits the manipulation signal to the control section 132 of the main body 10, thereby starting the distance measurement operation. At the same time as or after this, the activating section 430 transmits the manipulation signal to the detecting section 420 as well to activate the detecting section 420, and performs the detection of the current position, orientation, and environmental state of the display apparatus 20 and updates these results. The details of the distance measurement operation are described further below. When the distance measurement operation ends, the process moves to step S200.

At step S200, the activating section 430 of the display apparatus 20 transmits the manipulation signal to the display section 460 to activate the display section 460, and displays the distance measurement data in the display screen of the display device 25 or updates this display. The details of the display operation are described further below. By finishing the display operation, the overall flow of the distance measurement and display operations are finished.

Figure 8:
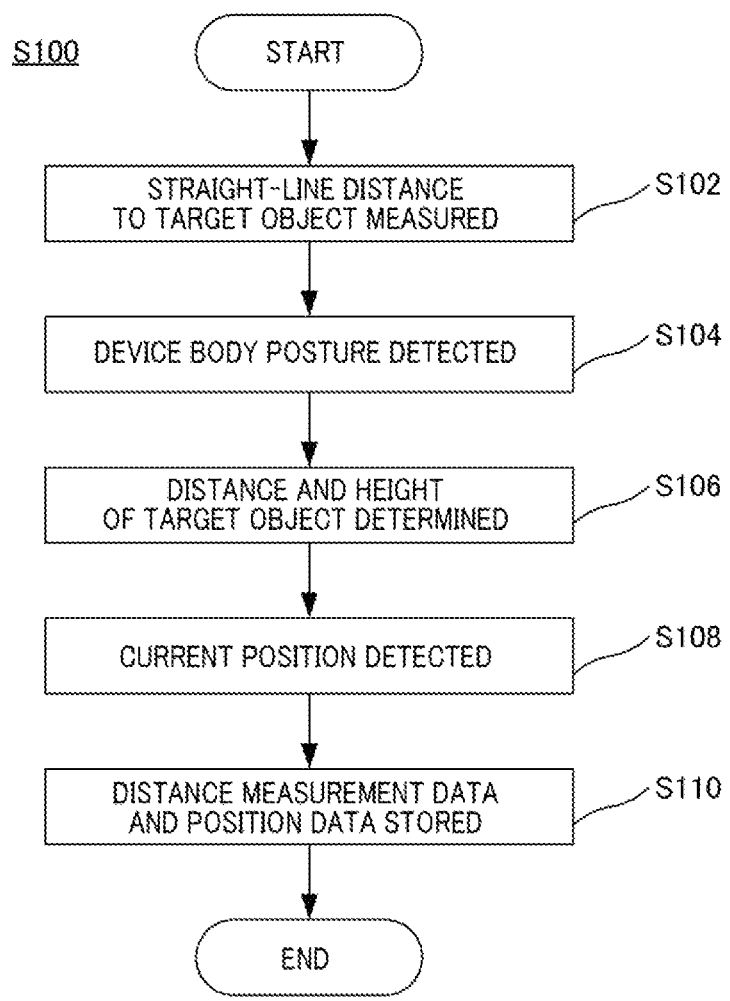
FIG. 8 shows a flow of the distance measurement operation.

FIG. 8 shows a flow of the distance measurement operation performed by the distance measuring apparatus 1 (main body 10).

At step S102, the straight-line distance D to the target object (measurement light irradiation point described above) is measured. First, under the control of the control section 132, the projecting section 100 radiates the measurement light toward the target object along a reference axis $L_0$. Next, the detecting section 200 detects the reflected light from the target object. Finally, the processing section 300 determines the detection time T from when the measurement light is radiated by the projecting section 100 to when the reflected light is detected by the detecting section 200, based on the detection results of the detecting section 200, and calculates the straight-line distance $D=Tc/2$ using the speed of light c. Note that, the detection time T may be determined by averaging results obtained respectively for a plurality of radiations of the measurement light.

At step S104, the posture of the device body (i.e. the distance measuring apparatus 1) is detected by the posture sensor 250. The inclination to the target object is determined according to the detection result of the angle θ detected by the posture sensor 250. This result is transmitted to the processing section 300.

At step S106, the distance (i.e. horizontal distance) d to the target object and the height h of the target object are determined by the processing section 300. The processing section 300 calculates the horizontal distance d=D cos(θ) and the height h=D sin(θ), based on the straight-line distance D determined in step S102 and the inclination θ determined in step S104. The processing section 300 transmits the calculated horizontal distance d and height h (i.e. the distance measurement data) to the display apparatus 20. Furthermore, the distance measurement data may be displayed in the reticle plate 140.

At step S108, the current position of the display apparatus 20 and the current timing are detected by the detecting section 420 (position detecting section 421) of the display apparatus 20, using the position sensor 22. In this way, the position and timing at which the distance measurement was performed can be acquired. The detection result of the current position (i.e. the position data) and the current timing (i.e. the measurement timing) are transmitted to the storage section 410.

At step S110, the distance measurement data obtained by the distance measurement in step S106 and the position data indicating the position at which the distance measurement was performed acquired at step S108 are stored by the storage section 410 of the display apparatus 20. Here, the storage section 410 stores the distance measurement data and the position data as a set with the measurement timing (see FIG. 4). The storage section 410 may further store the orientation data in this set.

Figure 9:
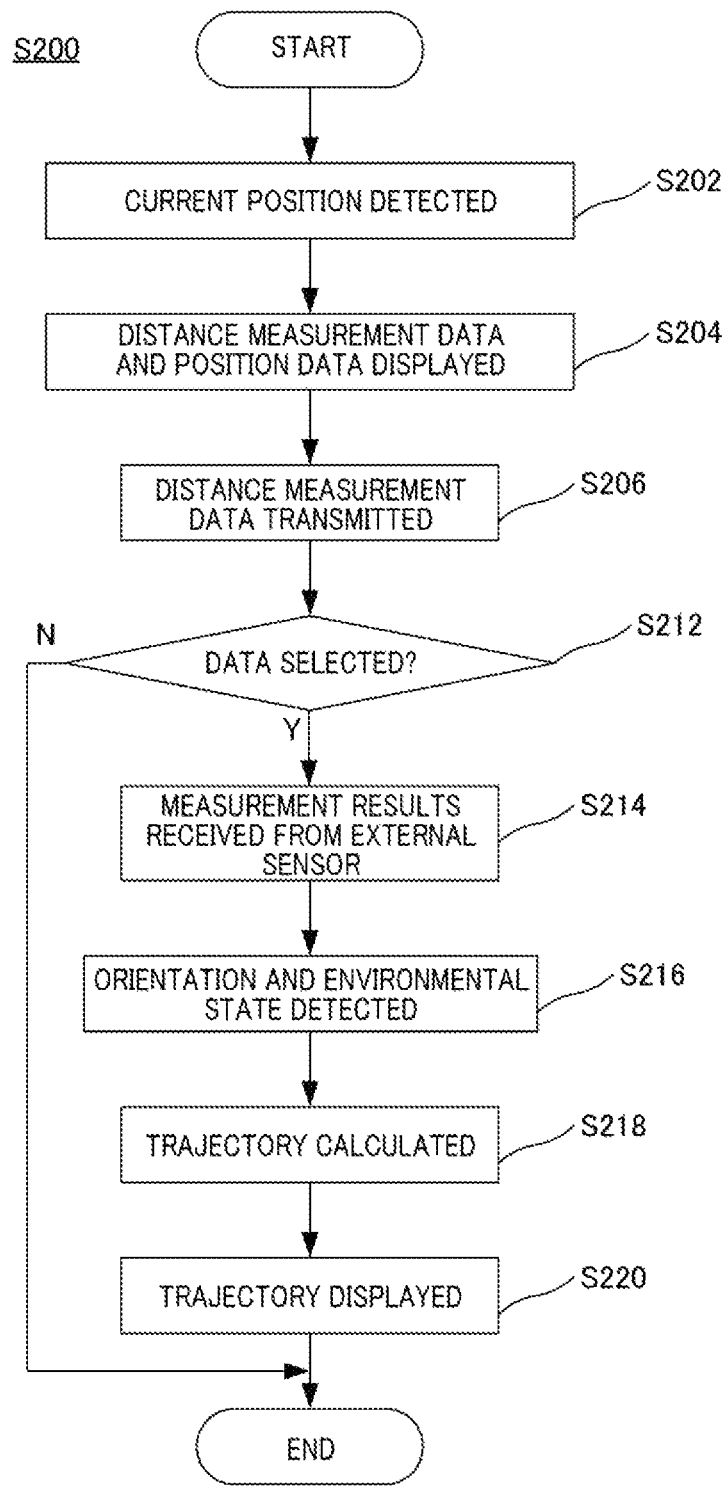
FIG. 9 shows a flow of the display operation.

FIG. 9 shows a flow of the display operation performed by the distance measuring apparatus 1 (display apparatus 20).

At step S202, the current position of the display apparatus 20 is detected by the detecting section 420 (position detecting section 421), using the position sensor 22. As an example, it is assumed that the position a5 in the stage "a" is detected as the current position of the display apparatus 20.

At step S204, the distance measurement data and the position data are displayed in the display screen of the display device 25 by the display section 460. The display section 460 reads the distance measurement data that is stored as a set with the position data (measurement position stored in the storage section 410) corresponding to the detection result of the current position detected in step S202, within the distance measurement data (see FIG. 4) stored in the storage section 410 (storage device 21). The display section 460 reads the three pieces of distance measurement data for which the measurement position indicated by the position data is included in the stage "a" associated with the current position a5. Note that, the display section 460 may read the distance measurement data for which the measurement position indicated by the position data approximately matches the current position or is included within a predetermined distance range from the current position. The read distance measurement data is displayed in the display screen of the display device 25 along with the position data and the measurement timing, as shown in FIG. 5, for example.

Note that, in a state where the distance measurement data is being displayed in the display screen of the display device 25 as shown in FIG. 5, the display operation may further be performed in response to the manipulation device 29 provided in the display apparatus 20 being pressed by the user. In such a case, the display in the display device 25 is updated by updating the detection result of the current position at step S202 and displaying the distance measurement data that is stored as a set with the position data corresponding to this current position updated at step S204. For example, it is assumed that the position b4 in the stage "b" is newly detected as the current position of the display apparatus 20 at step S202. The current position is updated to the position b4 in the stage "b", and at step S204, the display section 460 reads the two pieces of distance measurement data for which the measurement position indicated by the position data is included in the stage "b" associated with the current position b4, within the distance measurement data stored in the storage section 410 (storage device 21). The read distance measurement data is displayed in the display screen of the display device 25 along with the position data and the measurement timing, as shown in FIG. 6, for example.

At step S206, the distance measurement data read in step S204 is transmitted, along with the position data and the measurement timing, to a display apparatus separate from the display apparatus 20, by the communicating section 440 (transmitting section 442). The display apparatus 20 (i.e. a base unit) and the separate display apparatus (i.e. the extension unit) may be paired in advance, and the display apparatus that is the transmission destination may be selected using the manipulation device 29 of the display apparatus 20. The transmitted distance measurement data, position data, and measurement timing are displayed in the display screen of the extension unit. In this way, the distance measurement data can be shared in a group of display apparatuses associated with the display apparatus 20.

At step S212, the activating section 430 judges which piece of distance measurement data displayed in the display screen of the display device 25 has been selected by the user. The user can select the distance measurement data via the manipulation device 29. If distance measurement data has been selected, the process moves to step S214, and if distance measurement data has not been selected, the flow is finished.

At step S214, the measurement results of the environmental state are received by the communicating section 440 (receiving section 441) from the external sensor. Here, the communicating section 440 receives the measurement results of the wind velocity and wind direction from the wind speedometer (not shown in the drawings). Furthermore, the communicating section 440 may receive the measurement results of the environmental state from other environmental sensors provided outside the display apparatus 20. These measurement results are transmitted to the calculating section 450.

At step S216, the orientation of the display apparatus 20 is detected by the orientation detecting section 422, and the environmental state (humidity, temperature, pressure, or the like) in which the display apparatus 20 is placed is detected by the environment detecting section 423. These detection results are transmitted to the calculating section 450.

At step S218, the calculation of a trajectory of a golf ball, a bullet of a rifle, or the like, for example, is performed by the calculating section 450 for the distance measurement data selected in step S212. Here, the calculating section 450 corrects the trajectory calculation that is based on the distance measurement data, based on the measurement results of the wind velocity and wind direction received from the wind speedometer in step S214 and the detection result of the orientation and detection results of the environmental state detected in step S216. In this way, it is possible to acquire deviation in the left-right direction caused by the wind when a golf ball flies the measurement distance indicated by the selected distance measurement data, deviation of an impact position (i.e. deviation in the vertical direction caused by gravitational falling and deviation in the left-right direction caused by wind) when a rifle bullet flies the measurement distance indicated by the selected distance measurement data, and the like.

At step S220, the result of the trajectory calculation of step S218 is displayed in the display screen of the display device 25 by the display section 460. Note that, the result of the trajectory calculation may be transmitted to a display apparatus (i.e. an extension unit) that is separate from the display apparatus 20, by the communicating section 440 (transmitting section 442). In this way, it is possible to share the distance measurement data within a group of display apparatuses associated with the display apparatus 20.

The display apparatus 20 according to the present embodiment includes the storage section 410 that stores the distance measurement data acquired by performing the distance measurement and the position data indicating the position at which the distance measurement was performed as a set, the position detecting section 421 that detects the current position, and the display section 460 that displays the distance measurement data stored as a set with the position data corresponding to the detection result of the current position detected by the position detecting section 421, within the distance measurement data stored in the storage section 410. By displaying the distance measurement data that is stored as a set with the position data corresponding to the detection result of the current position detected by the position detecting section 421, within the distance measurement data stored in the storage section 410, with the display section 460, it is possible to display only the necessary distance measurement data corresponding to the current position to the user. Furthermore, in a case of a competition where the user competes with other players during a short limited time such as a shooting game, for example, there is no need for the user to measure the distances to the targets using a distance measuring apparatus during the competition, and furthermore, by displaying the distance measurement data with the display apparatus 20, the user can easily check the measured distance values in advance.

The distance measuring apparatus 1 according to the present embodiment includes the main body 10 for measuring the distance, and the display apparatus 20 attached in a detachable manner to the main body 10 for displaying the distance measurement data acquired by measuring the distance with the main body 10. In this way, it is possible to hold the distance measurement data obtained by measuring the distance using the distance measuring apparatus 1 in the display apparatus 20, separate the display apparatus 20 from the main body 10 and carry away the display apparatus 20, and display the distance measurement data as needed.

The display method according to the present embodiment includes a step of storing the distance measurement data acquired by measuring the distance and the position data indicating the position at which the distance measurement was performed as a set, a step of detecting the current position, and a step of displaying the distance measurement data that is stored as a set with the position data corresponding to the detection result of the current position, within the stored distance measurement data. In the step of displaying, by displaying the distance measurement data that is stored as a set with the position data corresponding to the detection result of the current position detected in the step of detecting, within the distance measurement data stored in the step of storing, it is possible to display only the necessary distance measurement data corresponding to the current position to the user.

Note that, in the distance measuring apparatus 1 according to the present embodiment, the display apparatus 20 is attached to the main body 10 in a detachable manner by connecting the connectors 9a and 19a provided respectively in the cases 9 and 19, but instead, the display apparatus 20 may be attached in a detachable manner by a cable or may be connected in a communicable manner by wireless communication.

Note that, the distance measuring apparatus 1 according to the present embodiment measures the distance to the target object, as an example, but may also measure the height of a target object such as a tree or building. In such a case, the distance measurement data (i.e. height data) that is stored as a set with the position data indicating the position of the target object of the measurement position corresponding to the detection result of the current position detected in step S202 is displayed in the display screen of the display device 25.

Furthermore, in a case where there are a plurality of trees, buildings, or the like around the current position, the orientations indicating the positions of trees, buildings, or the like using the current position as a reference are detected with the orientation detecting section, and these pieces of orientation data may be stored in the storage section 410 (storage device 21), along with the distance measurement data and the position data, as a set. FIG. 10 shows an example of stored sets of position data (measurement position), orientation data (orientation), and height data (height). In this example, a measurement height of 10 m of a first target object positioned at an orientation d from a measurement position c, a measurement height of 25 m of a second target object positioned at an orientation e from the same measurement position c, and a measurement height of 50 m of a third target object positioned at an orientation f from the same measurement position c are stored. Note that, measurement timings may also be stored in the sets.

In such a case, the orientation of the target object and the current position of the display apparatus 20 are detected by the detecting section 420 (position detecting section 421 and orientation detecting section 422) in step S202, and the height data that is stored as a set with the position data indicating the position of the target object of the measurement position corresponding to the detection result of the current position detected in step S202 and the orientation data indicating the orientation corresponding to the detection result of the orientation of the target object from the current position detected in step S202, within the height data stored in the storage section 410, is displayed in the display screen of the display device 25 by the display section 460 in step S204. For example, when the current position c and the orientation d of the display apparatus 20 are detected in step S202, the height data of the first target object corresponding to these detection results is displayed such as shown in FIG. 11 in step S204. With such a configuration, it is possible to know, for each of a plurality of target objects such as trees or buildings, the height data of the target object corresponding to the position data and the orientation data.

Note that, the distance measuring apparatus 1 according to the present embodiment is configured such that the main body 10 houses the display apparatus 20 in an attachable/detachable manner, but instead of this, the display apparatus 20 may be formed integrally with the main body 10 in an inseparable manner. In such a case, it is possible to update the display in the display device 25 by activating the position detecting section 421 and the orientation detecting section with the activating section 430, detecting the current position and orientation of the target object and updating these results, and displaying the distance measurement data that is stored as a set with the position data corresponding to this updated current position with the display section 460.

Furthermore, when measuring the distance of a target object whose height changes over time, such as a tree, at step S204 of FIG. 9, the distance measurement of the target object may be performed by the distance measuring apparatus 1 after the distance measurement data and the position data have been displayed, and the height data of the target object corresponding to the position data and orientation data stored in the storage section 410 may be updated. In such a case, the distance measuring apparatus 1 may be provided with an updating section that updates the height data of the target object, and the distance measuring apparatus 1 may further be capable of arbitrarily selecting the height data to be updated within the display apparatus 20 shown in FIG. 10. With such a configuration, if the height data of a target object whose height changes over time is measured and updated at constant time intervals, it is possible to easily know the height data measured immediately before the distance measurement.

Note that, in the distance measuring apparatus 1 according to the present embodiment, a distance measuring method using TOF for the projection of measurement light is adopted, but the method is not limited to this, and any distance measuring method such as a distance measuring method that detects the propagation time of measurement waves such as radio waves or sound waves may be adopted.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, according to an embodiment of the present invention, it is possible to realize a display apparatus and a distance measuring apparatus.

What is claimed is:

1. A display apparatus for displaying distance measurement data, comprising:
   a storage section for storing distance measurement data acquired by measuring a distance and position data indicating a position at which the distance measurement was performed, as a set;
   a position detecting section for detecting a current position; and
   a display section for displaying the distance measurement data stored as a set with the position data corresponding to a detection result of the current position detected by the position detecting section, within the distance measurement data stored in the storage section.

2. The display apparatus according to claim 1, wherein the distance measurement data is data acquired by measuring a distance with a distance measuring apparatus.

3. The display apparatus according to claim 1, further comprising:
   a calculating section for calculating a trajectory based on the distance measurement data.

4. The display apparatus according to claim 3, further comprising:
   an orientation detecting section for detecting an orientation; and
   a receiving section for receiving measurement results of wind velocity and wind direction from a wind speedometer, wherein
   the calculating section calculates a trajectory further based on the measurement results of wind velocity and wind direction received from the wind speedometer and a detection result of an orientation detected by the orientation detecting section.

5. The display apparatus according to claim 1, further comprising:
   an activating section for activating the position detecting section.

6. The display apparatus according to claim 1, further comprising:
   a transmitting section for transmitting the distance measurement data to another display apparatus.

7. The display apparatus according to claim 1, wherein the storage section stores a measurement timing at which the distance measurement was performed, along with the distance measurement data and the position data, as a set, and
   the display section displays the measurement timing stored as a set with the distance measurement data, along with the distance measurement data, as a set.

8. The display apparatus according to claim 1, further comprising:
   a receiving section for receiving distance measurement data acquired by measuring a distance with a distance measuring apparatus.

9. The display apparatus according to claim 1, further comprising:
   an orientation detecting section for detecting an orientation, wherein
   the storage section stores the distance measurement data, the position data, and orientation data detected by the orientation detecting section that indicates an orientation of a target object for which the distance measurement was performed, as a set, and
   the display section displays distance measurement data stored as a set with the position data corresponding to a detection result of the current position detected by the position detecting section and the orientation data corresponding to a detection result of the orientation of the target object for which the distance measurement was performed detected by the orientation detecting section, within the distance measurement data stored in the storage section, based on each of the current position detected by the position detecting section and the orientation of the target object for which the distance measurement was performed detected by the orientation detecting section.

10. A distance measuring apparatus comprising:
    a main body for measuring a distance; and
    the display apparatus according to claim 1 that is attached in a detachable manner to the main body and that is for displaying distance measurement data acquired by measuring a distance with the main body.

11. The distance measuring apparatus according to claim 10, wherein the display apparatus includes a storage device for storing the distance measurement data.

12. The distance measuring apparatus according to claim 10, wherein
the display apparatus includes a power source for operating the main body.

13. The distance measuring apparatus according to claim 10, wherein
the display apparatus includes a manipulation device for manipulating the main body.

14. A distance measuring apparatus comprising:
a main body for measuring a distance;
a storage section for storing distance measurement data acquired by measuring a distance and position data indicating a position at which the distance measurement was performed, as a set;
a position detecting section for detecting a current position; and
a display section for displaying the distance measurement data stored as a set with the position data corresponding to a detection result of a current position detected by the position detecting section, within the distance measurement data stored in the storage section, based on the current position detected by the position detecting section.

15. The distance measuring apparatus according to claim 14, further comprising:
an orientation detecting section for detecting an orientation, wherein
the storage section stores the distance measurement data, the position data, and orientation data detected by the orientation detecting section that indicates an orientation of a target object for which the distance measurement was performed, as a set, and
the display section displays distance measurement data stored as a set with the position data corresponding to a detection result of the current position detected by the position detecting section and the orientation data corresponding to a detection result of the orientation of the target object for which the distance measurement was performed detected by the orientation detecting section, within the distance measurement data stored in the storage section, based on each of the current position detected by the position detecting section and the orientation of the target object for which the distance measurement was performed detected by the orientation detecting section.

16. A display method for displaying distance measurement data with a display apparatus, comprising:
storing distance measurement data acquired by measuring a distance and position data indicating a position at which the distance measurement was performed, as a set;
detecting a current position; and
displaying distance measurement data stored as set with the position data corresponding to a detection result of the current position, within the stored distance measurement data.

17. The display method according to claim 16, wherein
the distance measurement data is data acquired by measuring a distance with a distance measuring apparatus.

18. The display method according to claim 16, further comprising:
detecting an orientation, wherein
the storing includes storing the distance measurement data, the position data, and orientation data detected in the detecting an orientation that indicates an orientation of a target object for which the distance measurement was performed, as a set, and
the displaying includes displaying the distance measurement data stored as a set with the position data corresponding to a detection result of the current position detected in the detecting the current position and the orientation data corresponding to a detection result of the orientation of the target object for which the distance measurement was performed detected in the detecting the orientation, within the distance measurement data stored in the storing, based on each of the current position detected in the detecting the current position and the orientation of the target object for which the distance measurement was performed detected in the detecting the orientation.

19. The display method according to claim 16, further comprising:
transmitting the distance measurement data to another display apparatus.

20. A display apparatus for displaying distance measurement data, comprising:
a receiving section for receiving distance measurement data acquired by measuring a distance with a distance measuring apparatus; and
a display section for displaying the distance measurement data received by the receiving section.

* * * * *